(12) United States Patent
Mundt et al.

(10) Patent No.: US 8,289,293 B2
(45) Date of Patent: Oct. 16, 2012

(54) INFORMATION HANDLING SYSTEM DUAL MODE TOUCH ENABLED SECONDARY DISPLAY

(75) Inventors: Kevin Mundt, Austin, TX (US); Ayedin Nikazm, Austin, TX (US); Nimish Ghatalia, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 364 days.

(21) Appl. No.: 12/820,224

(22) Filed: Jun. 22, 2010

(65) Prior Publication Data

US 2011/0310030 A1    Dec. 22, 2011

(51) Int. Cl.
*G06F 3/041* (2006.01)
(52) U.S. Cl. ............ 345/173; 345/536; 345/532
(58) Field of Classification Search .......... None
See application file for complete search history.

(56) References Cited

U.S. PATENT DOCUMENTS

| | | | |
|---|---|---|---|
| 8,094,132 B1 * | 1/2012 | Frischling et al. | 345/173 |
| 2006/0267987 A1 * | 11/2006 | Litchmanov | 345/502 |
| 2008/0174570 A1 * | 7/2008 | Jobs et al. | 345/173 |

* cited by examiner

*Primary Examiner* — Muhammad N Edun
(74) *Attorney, Agent, or Firm* — Hamilton & Terrile, LLP; Robert W. Holland

(57) ABSTRACT

A dual mode touchscreen display disposed in an information handling system chassis proximate a keyboard selectively presents images from information generated by a central processing unit or from information generated by a secondary processor associated with the touchscreen display. An operating system executing on the central processor unit presents information at the touchscreen through a serial link by treating the touchscreen as a secondary display to a primary display integrated in the chassis. Alternatively, an application executing on the secondary processor presents information at the touchscreen independent of the central processing unit or the operating system. As an example, the touchscreen display presents a number pad under the direction of the operating system to accept number pad inputs or, alternatively, presents a number pad under the direction of an application running on the secondary processor to accept number pad inputs that are forwarded to a keyboard controller.

20 Claims, 2 Drawing Sheets

INFORMATION HANDLING SYSTEM DUAL MODE TOUCH ENABLED SECONDARY DISPLAY

BACKGROUND OF THE INVENTION

1. Field of the Invention

The present invention relates in general to the field of information handling system input/output devices, and more particularly to an information handling system dual mode touch enabled secondary display.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling system capabilities have increased, manufacturers have sought to simplify end user interactions with information handling systems through various input/output (I/O) devices. Ideally, I/O devices improve the end user experience and help end user's take advantage of the full range of system capabilities. One area of improvement in I/O devices is the display of information with liquid crystal displays (LCDs). LCDs provide images with good resolution and low power consumption, and are typically integrated in the chassis of portable information handling systems. Serial links and interfaces provide substantial bandwidth that allows communication of high resolution images. Information handling system end users will sometimes connect multiple displays to a single system to provide convenient presentation of large amounts of information. Another area of improvement in I/O devices is the integration of touch sensitive portions in a display to form a touchscreen display. With a touchscreen, an application running on a processor of the information handling system presents an image of an input device at a touch sensitive portion of the screen so that an end user can make inputs by touching the screen. For example, an LCD presents an image of a number pad having number keys and accepts number inputs based upon end user inputs at the image.

A typical portable information handling system will have several integrated input devices, such as a keyboard, a number pad, a point stick, a touch screen and a touch pad. A touch pad is a flat area usually located near the keyboard that an end user touches to move a mouse cursor on a display. One recent development is to replace the mouse pad with a similarly-sized touchscreen. The touchscreen offers the functionality of a mouse pad, but also is available to present information as images much as second display might present information as images. For example, the touchscreen interfaces with an operating system executing on the information handling system through a serial link, such as a USB or PCI Express link, so that the operating system can present information at the touchscreen as it would at any secondary display. In this manner, the operating system offers flexibility for the use of the mouse pad touchscreen display, such as presenting a number pad. One difficulty with the use of a touchscreen as a mouse pad is that the touchscreen has limited if any use when the operating system is unable to communicate an image for presentation at the touchscreen. The operating system is sometimes unavailable, such as during maintenance or limited modes of operation, like reduced power states, which restricts end user access to the mouse pad touchscreen.

SUMMARY OF THE INVENTION

Therefore a need has arisen for a system and method which supports presentation of information at an integrated touchscreen input device with or without the primary operating system of the information handling system.

In accordance with the present invention, a system and method are provided which substantially reduce the disadvantages and problems associated with previous methods and systems for presenting information at secondary display input devices integrated into an information handling system. A secondary display having an integrated processor presents information in a slave mode managed by an operating system of an information handling system executing on a CPU or in an independent mode with an embedded application executing on the secondary display processor.

More specifically, an information handling system has a processor that executes applications under the management of an operating system to present information as images at a primary display and a secondary display integrated in the system chassis proximate a keyboard in the position typically occupied by a number pad. The secondary display includes an integrated processor that executes embedded applications, such as applications stored in non-volatile memory of the secondary display. In a slave mode, the secondary display presents images under the management of the host operating system and receives inputs made at a touchscreen for communication to the operating system. In an independent mode, the secondary display presents images generated locally with an embedded application running on the secondary display processor. In the slave mode, the operating system manages displays at the secondary display through a serial link, such as a USB link. In the independent mode, the secondary display communicates inputs made at the touchscreen to an embedded controller through a management bus. Thus, for instance, an identical number pad I/O device may be presented at the secondary display in either the independent or slave modes with inputs made at the I/O device communicated to the system through the USB link or a management bus.

The present invention provides a number of important technical advantages. One example of an important technical advantage is that an integrated secondary screen that accepts touch inputs operates in dual modes. In a secondary operating mode, embedded applications execute on a processor of the secondary screen that is agnostic to the primary operating system of the information handling system. In a primary operating mode, a driver of the primary operating system interacts with the secondary screen to control presentation of information at the secondary screen by the operating system. The driver of the primary operating system enables host driven applications managed by the operating system for ease of use. The secondary operating mode supports embedded applications that operate independently of the main system so that information and functions are available through the secondary display even where other portions of the information handling system are unavailable, such as in a reduced power mode. End users can develop and execute their own embedded applications to improved the overall usability of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A secondary display selectively presents information under management of an information handling system host operating system or independently with embedded applications. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
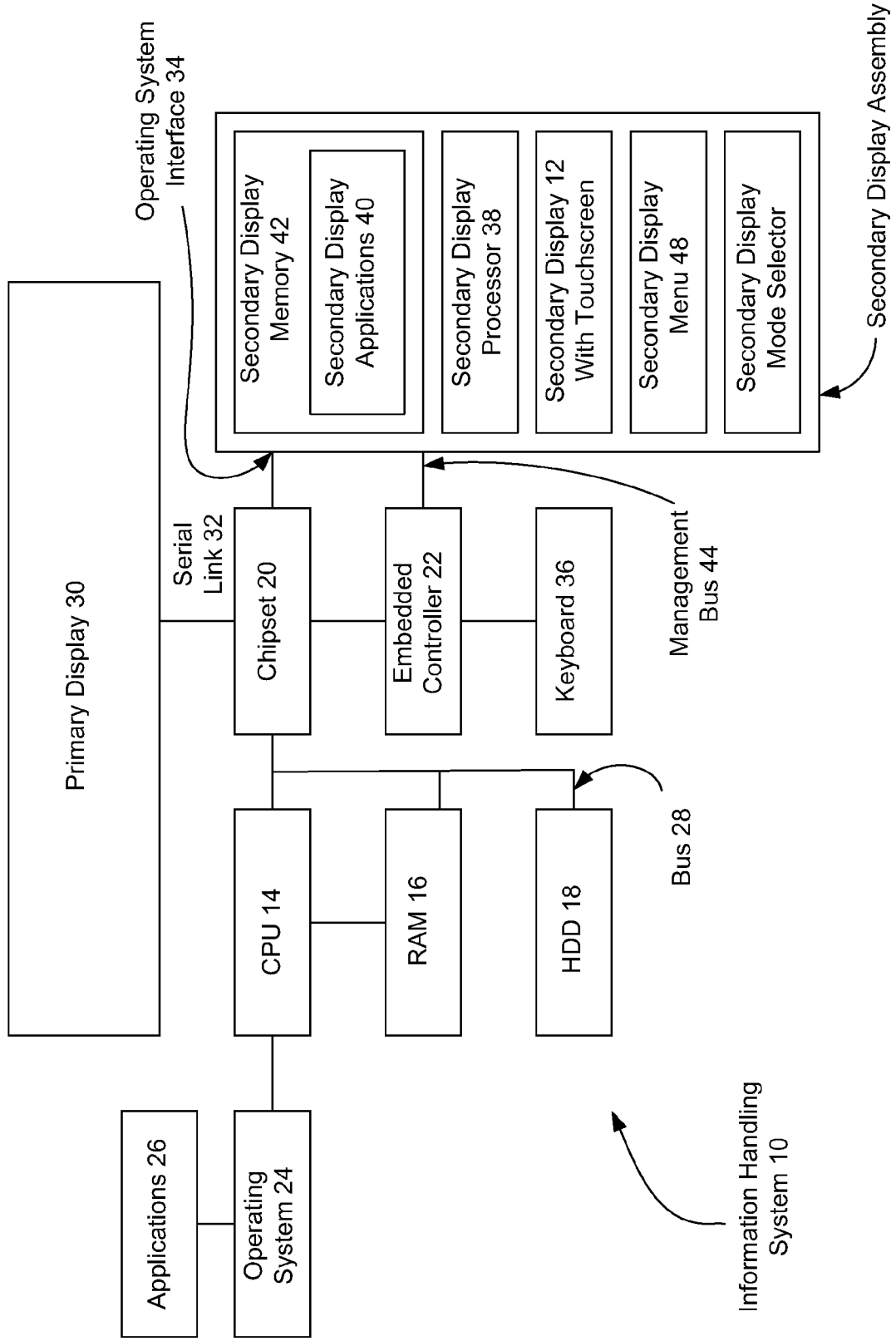
FIG. 1 depicts a block diagram of an information handling system configured with a dual mode secondary touchscreen display.

Referring now to FIG. 1, a block diagram depicts an information handling system 10 configured with a dual mode secondary touchscreen display 12. Information handling system 10 is built from plural processing components that cooperate to process information, such as a CPU 14, RAM 16, a hard disk drive 18, a chipset 20 and an embedded controller 22. For example, an operating system 24 executing on CPU 14 supports operation of applications 26 that generate information for presentation to an end user. The information is communicated to chipset 20 through a bus 28, such as a PCIe serial link. Graphical processing resources of chipset 20 process the visual information to generate images for presentation at a primary display 30. Chipset 20 communicates the image information to primary display 30 through a serial link 32, such as a DVI or USB link. In addition to presentation of a primary image at primary display 30, operating system 24 manages presentation of secondary images at secondary display 12. For example, WINDOWS has the capability for presentation of images at multiple displays by sending the secondary image information to an operating system interface 34 of the secondary display 12, such as a USB interface.

When under the management of operating system 24, secondary display 12 presents images with information generated by operating system 24 or applications 26 through operating system interface 34 and provides inputs made at a touchscreen of secondary display 12 back to the operating system through operating system interface 34. In one embodiment, operating system 24 presents an input/output (I/O) device at secondary display 12, such as a number pad typically found at one end of a keyboard 36. Keyboard 36 is, for example, physical keys integrated into a portable chassis of a portable information handling system that do not include number keys. Operating system 24 lets an end user selectively present a number pad to accept number inputs made through the touchscreen of secondary display 12. Alternatively, operating system 24 presents an image at secondary display 12 that is a graphical user interface for an application 26 with a primary image at primary display 30. Thus, an end user presents a selected of plural I/O device images at secondary display 12 with selection of the image made through operating system 24 and inputs at the touchscreen managed by operating system 24 through a serial link 32 and operating system interface 34. In this operating system mode, secondary display 12 essentially operates as any display might that is interfaced with an information handling system 10 through a bi-directional serial interface or other interface. When presenting an I/O device, such as a number pad, at the secondary display, operating system 24 determines whether inputs made at the secondary display will control cursor presentation at the second display. For example, with a number pad I/O device presented at secondary display 12 by operating system 24 would retain the cursor at primary display 30 when touches are made at the number pad. In other I/O device presentations, operating system 24 may selectively present the cursor at secondary display 12 when inputs are made at secondary display 12.

In some circumstances, operating system 24 is unavailable or unable to support presentation of images at multiple displays. For example, most version of WINDOWS have the ability to support multiple displays interfaced with an information handling system, while most versions of LINUX without add-on software applications do not support presentation from multiple displays. Thus, an information handling system having a secondary display will have limited if any use of the secondary display through operating system interface 34 if WINDOWS is not loaded, such as if the information handling system is in a powered down state or has LINUX loaded as the operating system. In order to provide secondary display functionality in multiple modes, secondary display 12 has an integrated secondary display processor 38 that executes display applications 40 independent of operating system 24. For example, secondary display processor 38 is a TMS320DM365 processor that executes display applications 40 embedded in secondary display memory 42, such as nonvolatile flash memory. Display applications 40 present images at secondary display 12 that are generated from information created at secondary display processor 38.

In one example embodiment, the images generated by secondary display processor 38 are the same I/O devices that are presented during management of displays at secondary display 12 by operating system 24, such as a number pad. In the example of the number pad, the presentation of the number pad at secondary display 12 and the interaction with an end user are indistinguishable to the end user in the operating system or display processor modes, however, the interaction between processing components to provide the number pad functionality is different for the operating system (slave) and display processor (independent) modes. In the independent mode, a display application 40 executing on display processor 38 presents the number pad and determines inputs made at the number pad. The display application 40 communicates the inputs from secondary display 12 to embedded controller 22 using keyboard scan codes sent through a management bus 44, such as an SMBus using an I2C protocol. Embedded controller 36 treats scan codes received from secondary display screen 12 as if the scan codes were sent from a physical number pad associated with keyboard 36. For other types of devices presented at secondary display 12 by a display application 40, interaction with embedded controller 22 through management bus 44 is managed with firmware instructions executing on embedded controller 22 that, in turn, communicate with chipset 20 and CPU 14. However, many display applications 40 execute independently from any communications with other processing components of information handling system 10, such as calculators that accept inputs and presents the results of calculations at secondary display 12.

A display mode selector 46 executing on secondary display processor 38 determines whether secondary display 12 operates in a slave mode under management of operating system 24 or independent mode by executing display applications 40. A secondary display menu 48 presented on secondary display 12 allows manual selection of the slave or independent modes. For example, an icon presented at a small portion of secondary display 12 when in the slave mode allows selection by an input at the icon so that a full menu 48 appears at the secondary display 12 of available secondary display applications 40. Alternatively, display mode selector 46 detects through operating system interface 34 whether operating system 24 is active and, if operating system 24 is not active then display mode selector 46 automatically defaults to independent mode for presentation of information from a display application 40 at secondary display 12. Automatic default to independent mode by display mode selector 46 may also be enforced when the information handling system is in a reduced power state that leaves the operating system unavailable or only partially available. In one embodiment, operating system 24 presents a window at primary display 30 that allows an end user to select slave or independent mode presentation at secondary display 12, and communicates selections to display mode selector through operating system interface 34. Where operating system 24 does not have native support for multiple displays, a driver add on to operating system 24 will provide access to secondary display 12 for slave mode applications. If the driver add-on is not available, then secondary display 12 defaults to independent mode.

Figure 2:
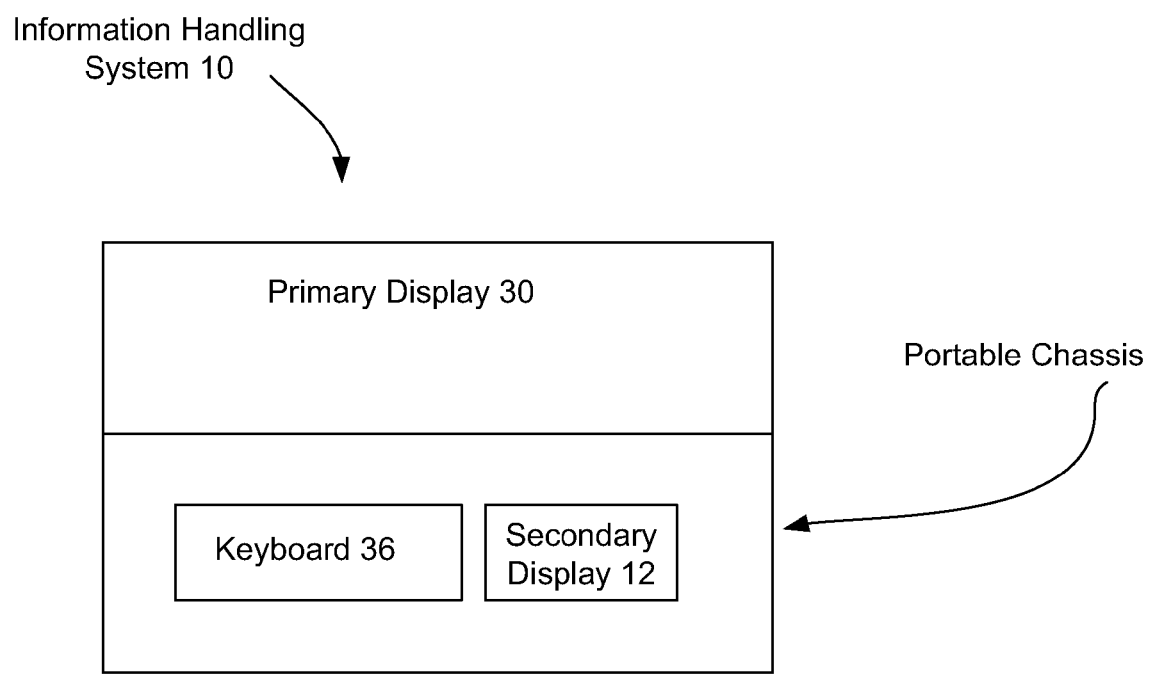
FIG. 2 depicts a front view of an information handling system have a dual mode secondary display that operates in a slave mode to an operating system or in an independent mode.

Referring now to FIG. 2, an information handling system 10 is depicted having a dual mode secondary display 12 that operates in a slave mode to an operating system or in an independent mode. Information handling system 10 is built in a portable chassis 50 having a rotatable lid. Secondary display 12 is disposed in portable chassis 50 just to the right of keyboard 36 in the position normally used by a physical number pad. When in the slave mode, secondary display 12 may present information under the management of the operating system much as any second display would if connected by a USB or similar interface. In an embodiment that presents a slave number pad or similar input device at secondary display 12, the operating system manages cursor placement so that the cursor does not transfer to the secondary display when touch inputs are made at the secondary display. In other embodiments, the operating system may allow the cursor to travel from primary display 30 to secondary display 12 when secondary display 12 is touched based on a configuration of the operating system or a user setting. In one embodiment, the operating system boots to a default state having the number pad displayed at secondary display 12.

In the independent mode, secondary display executes a local embedded application on an integrated processor of the secondary display and independent of the operating system. The embedded display application presents visual information generated with the processor of secondary display 12. As a default in power up or when management by the operating system is not available or not selected, secondary display 12 presents a number pad that supplements keyboard 36 through an embedded controller (also known as a keyboard controller). Other embedded display applications include a standard, a financial, a graphing and a scientific calculator, each of which perform calculations with the secondary display processor and present results at the secondary display. Note that functionally identical applications might also be available under operating system management with the calculations performed by the system CPU. One embedded application accepts inputs through a jog shuttle that obtains rotational data from jog shuttle image presented at the secondary display. The rotational data accepted at a touchscreen of secondary display 12 is communicated for system use through an embedded controller with scan code information. Input devices presented in the independent mode in addition to the number pad include a three button mouse or other 3d navigational device. The type of input device is selectable through a menu presented at secondary display 12. In some embodiments, the secondary processor of secondary display 12 executes embedded display applications in an independent mode that selectively use system assets, such as network communications and speaker assets. One such embedded display application is a Voice over Internet Protocol (VoIP) application, such as SKYPE, that executes on secondary display 12 to establish VoIP and video communications through a network interface and presents the video at secondary display 12. Another such embedded display application is a media player, such as an MP3 player, that retrieves music from non-volatile storage, such as a hard disk drive, presents music selections at secondary display 12, and plays music selected through touchscreen inputs at a speaker of information handling system 10. To reduce system power consumption, secondary display 12 optionally executes VoIP and media player embedded applications with the system in a reduced power state and desired assets, such as the system speaker, network interface card and hard disk drive, selectively powered up with firmware instructions of the chipset, such as the BIOS, and controlled by the secondary display processor through the embedded controller. The secondary display communicates with the selected assets through the management bus, or alternatively, through a serial link interfaced with the system chipset and BIOS, such as a USB interface.

In addition to embedded applications, secondary display 12 may optionally include a development kit that allows an end user to create embedded display applications. One example of an end user created embedded display application is a CAD drawing menu presented at secondary display 12 while a CAD drawing program executes on the system CPU. By supporting the CAD drawing menu as an embedded application executing in an independent mode, an end user may have the CAD drawing menu available whether or not the operating system running on the CPU supports slave mode operations of secondary display 12.

On a system level, end users may selectively allocate processing tasks between slave mode and independent mode use of the secondary display 12 depending upon processing capacity of information handling system 10. Generally, for tasks that require more intense processing, use of the slave mode will provide the most responsive processing since full system resources are available for presentation of information at secondary display 12. For example, video conferencing through secondary display 12 will tend to have less interruptions and greater clarity if done with the CPU, available graphics processing and operating system management. However, a situation may arise where an end user has an application running over the operating system that uses considerable processing resources so that the end user may elect to perform lower quality of video conferencing in the independent mode. Having the capacity to perform a function in both the independent and slave modes provides greater flexibility to an end user for the allocation of resources across a system.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis;
   a central processing unit disposed in the chassis and operable to process information;
   memory disposed in the chassis and interfaced with the central processing unit and operable to store information;
   a primary display disposed in the chassis and interfaced with the central processing unit, the primary display operable to present the information as images;
   a secondary display disposed in the chassis and interfaced with the central processing unit, the secondary display operable to present the information as images;
   a primary operating system executing on the central processing unit and operable to manage communication of the information to the primary display and the secondary display for presentation of selected images at the primary display and the secondary display;
   a secondary processor associated with the secondary display; and
   one or more secondary display applications operable to execute on the secondary processor, the secondary display applications generating secondary information for presentation as images at the secondary display based upon one or more predetermined conditions.

2. The information handling system of claim 1 wherein the predetermined conditions comprise the primary operating system in a non-operational state.

3. The information handling system of claim 1 further comprising a secondary display menu, the predetermined condition comprising a selection at the display menu for presentation at the secondary display of information generated by a secondary display application executing on the secondary processor.

4. The information handling system of claim 1 wherein the secondary display comprises a touchscreen that accepts user touches as inputs and the secondary display application comprises presentation of an input device.

5. The information handling system of claim 4 wherein the secondary processor communicates inputs made at the presentation of the input device as keyboard scan codes.

6. The information handling system of claim 5 wherein the input device comprises a number pad.

7. The information handling system of claim 4 wherein the input device comprises a calculator, the secondary processor performing calculator functions based upon inputs made to the calculator and presenting the results of the calculator functions at the secondary display.

8. The information handling system of claim 4 wherein the input device comprises a VoIP device operable to support VoIP communications.

9. The information handling system of claim 4 wherein the input device comprises a media player operable to present media information generated by a media application executing at the secondary processor.

10. A method for presenting information at an information handling system, the method comprising:
    generating primary information with a central processing unit;
    generating secondary information with a secondary processor;
    presenting an image at a primary display based upon the primary information; and
    presenting an image at a secondary display based upon either the primary information or the secondary information;
    wherein presenting an image with the primary information or the secondary information at the secondary display is selectively based upon one or more predetermined conditions.

11. The method of claim 10 wherein the predetermined condition comprises a menu selection from a menu presented at the secondary display.

12. The method of claim 10 wherein the predetermined condition comprises an operational state of an operating system executing on the central processing unit.

13. The method of claim 10 wherein the secondary information comprises an input device, the method further comprising:
    presenting an image of input device at the secondary display;
    accepting inputs through the input device with a touchscreen incorporated in the secondary display; and
    communicating the inputs to the central processing unit through keyboard scan codes sent from the secondary processor.

14. The method of claim 13 wherein the input device comprises a number pad.

15. The method of claim 10 wherein the predetermined condition comprises execution of an application at the secondary processor, the application generating secondary information comprising VoIP communication.

16. The method of claim 10 wherein the predetermined condition comprises execution of an application at the secondary processor, the application generating a calculator interface and performing calculation with the secondary processor.

17. The method of claim 10 wherein the primary information presented at the secondary display is presented under the management of an operating system.

18. A system for presenting information as images at an information handling system, the system comprising:
    a touchscreen device having a display to present information and to accept touch inputs and having a processor operable to execute applications;
    memory storing one or more applications that execute on the processor to generate information for presentation at the display;

an operating system interface operable to accept information for presentation at the display from an operating system executing on a distal processor; and a selector operable to present information generated by the processor or information received from the operating system interface based upon one or more predetermined conditions.

19. The system of claim 18 wherein the one or more applications comprise a number pad I/O device, the system further comprising a management bus interface, the management bus interface operable to communicate inputs at the number pad I/O device to an embedded controller through a management bus.

20. The system of claim 18 wherein the one or more applications comprise a media player operable to present media information generated at the processor.

* * * * *